United States Patent
Bredthauer et al.

(10) Patent No.: US 7,698,081 B2
(45) Date of Patent: Apr. 13, 2010

(54) COMPONENT OF A TECHNICAL INSTALLATION

(75) Inventors: Jürgen Bredthauer, Eckental (DE); Mark Halpin, Dublin (IE); Annette Irl, Munich (DE); Michael Lohe, Uster (CH); Wolfgang Menapace, Erlangen (DE); Eckhard Nees, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 662 days.

(21) Appl. No.: 10/579,279

(22) PCT Filed: Nov. 8, 2004

(86) PCT No.: PCT/EP2004/052859
§ 371 (c)(1),
(2), (4) Date: Feb. 21, 2007

(87) PCT Pub. No.: WO2005/050504
PCT Pub. Date: Jun. 2, 2005

(65) Prior Publication Data
US 2007/0129821 A1    Jun. 7, 2007

(30) Foreign Application Priority Data
Nov. 12, 2003    (EP)    .................. 03025919

(51) Int. Cl.
*G01D 18/00*    (2006.01)
(52) U.S. Cl. ........................................... 702/85
(58) Field of Classification Search .................. 702/85
See application file for complete search history.

(56) References Cited

U.S. PATENT DOCUMENTS

| 2003/0023516 A1* | 1/2003 | Sharrow et al. ............... 705/28 |
| 2005/0007249 A1* | 1/2005 | Eryurek et al. ............... 340/511 |
| 2005/0096873 A1* | 5/2005 | Klein ........................... 702/184 |

* cited by examiner

*Primary Examiner*—Aditya Bhat

(57) ABSTRACT

A Component of a technical installation comprises a memory unit for storing identification data related to the component and/or technical date related to the component and/or a user manual and/or transportation information related to the component and/or links directed to further information related to the component.

11 Claims, 2 Drawing Sheets

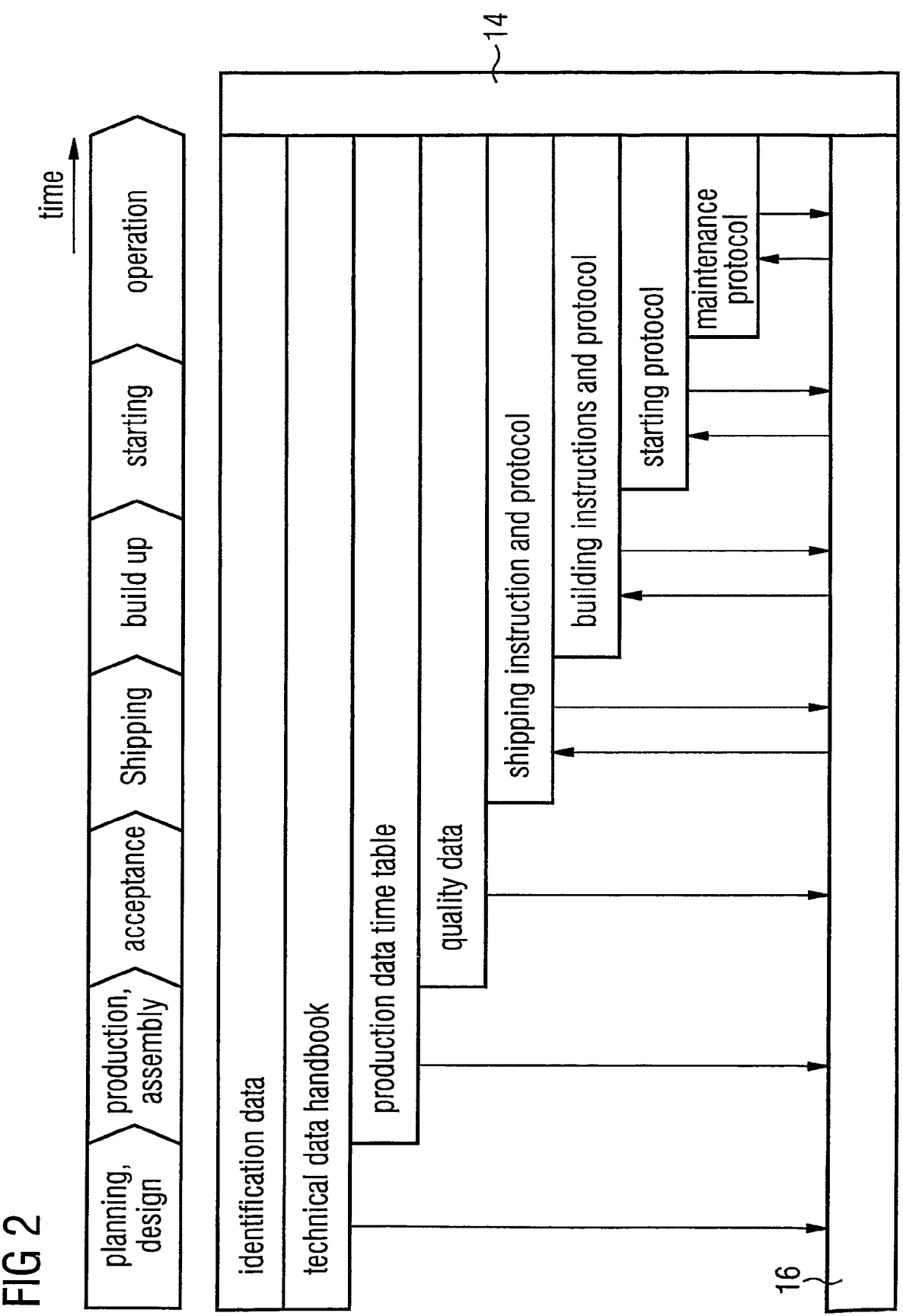

US 7,698,081 B2

COMPONENT OF A TECHNICAL INSTALLATION

CROSS REFERENCE TO RELATED APPLICATIONS

This application is the US National Stage of International Application No. PCT/EP2004/052859, filed Nov. 8, 2004 and claims the benefit thereof. The International Application claims the benefits of European Patent application No. 03025919.6 filed Nov. 12, 2003. All of the applications are incorporated by reference herein in their entirety.

FIELD OF THE INVENTION

The present invention relates to a component of a technical installation, in particular the invention relates to technical installations such as power generating plants and their accessories.

BACKGROUND OF THE INVENTION

Whenever components or products of a technical installation are shipped to a customer it is necessary to separately ship a documentation including information such as identification data or technical data of the component shipped. Further, in particular with regard to large technical installations, during transportation, erection and commissioning the information of the installation has to be matched with a manual which has to be handed out to the costumer. Then, e.g., at the customer side, it is hard to identify the match between the single component and its documentation, and the manuals often are not at hand. During service life it is difficult to identify the correct spare parts, and the maintenance instructions are not always at one's fingertips.

SUMMARY OF THE INVENTION

Accordingly, it is the object underlying the invention to provide a component of a technical installation at which the handling of data is simplified and, furthermore, at which and the costs for the technical documentation are lower than for common components of technical installations.

The object is solved by a component of a technical installation comprising a memory unit for storing identification data related to the component and/or technical data related to the component and/or a user manual and/or transportation information related to the component and/or links directed to further information related to the component.

The solution according to the invention overcomes the separation between hardware components of technical installations and its identification and description. By providing at least one memory unit at the component in which the different kinds of identification and description of the component and its subsystems are stored the invention avoids mistakes, misunderstanding and delay because of non-availability of documents. Accordingly, the quality and availability of documentation for commissioning, assembly, erection and service staff is continuously improved during the entire lifecycle of the component and its sub-systems.

According to a preferred embodiment of the component in accordance with the invention the memory unit for storing identification data includes a plant number storage space, a customer number storage space, a serial number storage space, a drawing number storage space, and/or a spare part number storage space.

Further, preferably, the memory unit for storing technical data related to the component includes a type of component storage space, a basic parameter storage space, and/or a threshold storage space.

In addition or alternatively, the memory unit for storing a user manual preferably includes a product manual storage space, an operation manual storage space, a service/maintenance instructions storage space, and/or a service/maintenance protocol storage space.

More preferably, the memory unit for storing transportation information related to the component includes a commissioning manual storage space, a package number storage space, a transportation manual storage space, a transportation protocol storage space, an erection manual storage space, and/or an erection protocol storage space.

Furthermore, it is preferred that the memory unit for storing links directed to further information related to the component includes a hotline number storage space.

The above mentioned memory units of preferred embodiments of the invention all improve accessibility to information which is particularly important during the lifecycle of the component of the invention.

In contrast to written information, the information electronically stored in accordance with the invention can be easily found by providing means for searching information in at least one of the memory units of the component.

In order to improve accessibility of the information stored in accordance with the invention, the component advantageously further comprises a wired and/or wireless interface for reading information stored in the at least one memory unit.

Finally, preferably, the component of the invention comprises an interface for connecting the at least one memory unit via an intranet or the internet. Accordingly, a large number of various persons can access the stored data without any need of duplication of these data. For restricting the access to the data a password protection means should be provided.

BRIEF DESCRIPTION OF THE DRAWINGS

These and other aspects, advantages and salient features of the invention will become apparent from the following detailed description, which, when taken into conjunction with the annexed drawings, discloses an embodiment of the invention.

FIG. 2 is a schematic illustration of the way of storing and reading information in a memory unit of the invention during the lifecycle of a corresponding component.

DETAILED DESCRIPTION OF THE INVENTION

Figure 1:
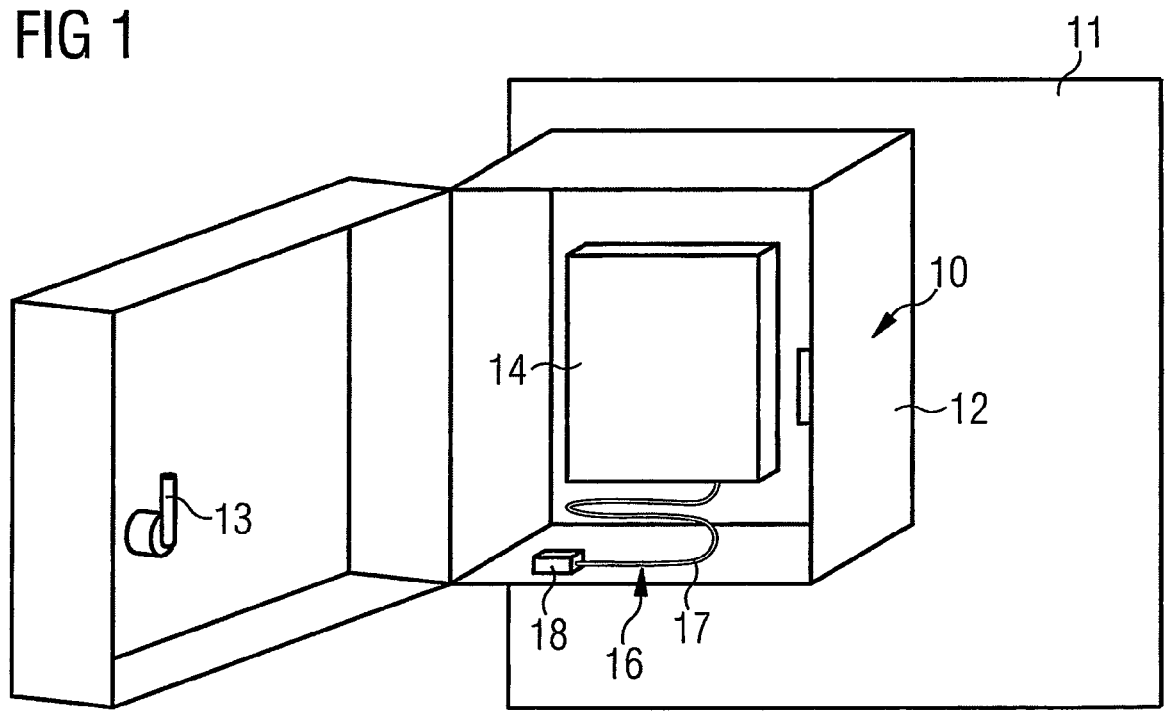
FIG. 1 is a schematic illustration of an embodiment of a memory unit of the invention.

FIG. 1 shows a memory unit 10 in the form of a memory box which is mounted near a bearing pedestal of a power station 11.

The memory unit 10 includes a casing 12 having a lock 13, in which a memory chip 14 is located. the memory chip 14 is one of the kind used in USB memory sticks. The memory chip is electrically connected with an interface 16 in the USB 2.0 standard. The interface 16 includes a cable 17 and a connector 18 at the end of the cable 17. The interface 16 provides a reading speed of up to 6 MB/s and a writing speed of up to 4.5 MB/s. The memory chip 14 has a memory size of 512 MB. The operating temperature of the memory unit 10 is between 0° F. and 50° F.

The documents stored in the memory chip 14 are in particular a product manual, an operation manual and erection protocols. The amount of data stored is about 3000 pages in the format of searchable pdf-documents.

The information stored in the memory unit 10 are classified into four groups: identification, general information, history and documentation. The group of identification includes in particular the serial number, package number, customer, plant, and rating plate data. The general information included data, e.g., of the type of component or system, meta information (like drawing numbers, erection-groups and sequence numbers) and material-subgroups.

The history group includes the product date, transportation information, erection information, commissioning information, the times of maintenance, and protocols about versions and revision states.

The documentation group finally includes a product manual, a description, an erection manual, erection drawings, a commissioning manual, a manual concerning the operation, service instructions and at least one hotline-number.

The search of information stored in the memory unit is improved by a neural network means and the integration of "turnover package" information. Further, there is provided a connection with RF-ID technology to identify single parts, spare parts and turnover packages.

Furthermore, the memory unit is adapted to support other programs like "tracking and tracing".

The information on the memory unit are written and recalled by means of a remote access via the web server technology.

FIG. 2 depicts the lifecycle of a component in accordance with the invention and the relevant content of the memory chip 14 in respect of the different phases of the lifecycle.

In general the memory chip 14 exemplary includes identification data, technical data, a handbook, production data, time tables, quality data, shipping instructions and protocols, building instructions and protocols, starting protocols, and maintenance protocols.

These different kinds of information are stored and retrieved during different phases of the lifecycle of the corresponding component, which are, e.g., the planning and design, the production and assembly, the acceptance, the shipping, the build up, the starting, and the operation. While some of the data are relevant during the entire lifecycle, other information are stored during later phases of the lifecycle and can be easily accessed thereafter via the interface 16.

Further, to the above mentioned information the invention provides the possibility to store information within the memory unit which refers to the disassembly and/or the recycle of certain parts of the component. Thus, the invention further improves the possibility to handle parts of the component in a particularly required way even many years after their installation.

The invention claimed is:

1. A power plant, comprising:
   a turbine;
   an electric generator physically connected to the turbine, wherein the turbine and the electric generator comprise a plurality of different hardware components, wherein a lifecycle of a respective component comprises a plurality of lifecycle phases uniquely applicable to the respective component, wherein the different components throughout their respective lifecycles are subject to different lifecycle phases;
   a computer network operatively connected to the turbine and to the generator;
   a connector operatively connected to the computer network having a receptacle; and
   a removable memory media sized and configured for insertion into the receptacle so that data stored in the memory media can be uploaded to the computer network,
   a neural network configured to search the data stored in the removable memory media; wherein the data stored in the removable memory media includes historical information indicative of the different lifecycle phases of the different components uniquely applicable to the different components, wherein the data stored in the removable memory media is organized based on the historical information of the different components to reflect the unique lifecycle phases to which the different components have been subjected, wherein the neural network is configured to retrieve information from the removable memory media for the different components as the different components undergo their respective lifecycle phases, wherein said retrieved information is further configured to identify components that can be disassembled and/or recycled as a lifecycle of the power plant reaches an end, wherein the data stored in the removable memory media comprises:
   component identification data,
   component technical data,
   component user manual data,
   component transportation data, and
   a component related data link to additional information.

2. The power plant as claimed in claim 1, wherein the memory media for identification storage includes storage space selected from the group consisting of: plant number storage space, customer number storage space, serial number storage space, drawing number storage space, and spare part number storage space.

3. The power plant as claimed in claim 2, wherein the memory media for technical data storage includes storage space selected from the group consisting of: type of component storage space, basic parameter storage space, and threshold storage space.

4. The power plant as claimed in claim 3, wherein the memory media for user manual storage includes storage space selected from the group consisting of: product manual storage space, operation manual storage space, service and maintenance instructions storage space, and service and maintenance protocol storage space.

5. The power plant as claimed in claim 4, wherein the memory media for storing transportation information related to the component includes storage space selected from the group consisting of: commissioning manual storage space, package number storage space, transportation manual storage space, transportation protocol storage space, erection manual storage space, and erection protocol storage space.

6. The power plant as claimed in claim 5, wherein the memory media that stores data links includes a hotline number storage space.

7. The component as claimed in claim 6, wherein the data links are internet web links.

8. The component as claimed in claim 7, further comprising the ability to search information in at least one of the memory units of the component.

9. The component as claimed in claim 8, further comprising a wired or wireless interface for reading information stored in the memory unit.

10. The component as claimed in claim 9, further comprising an interface for connecting the memory unit to an intranet or the internet.

11. The component as claimed in claim 10, wherein the memory media data is contained in a single memory unit.

* * * * *